Figure 1:
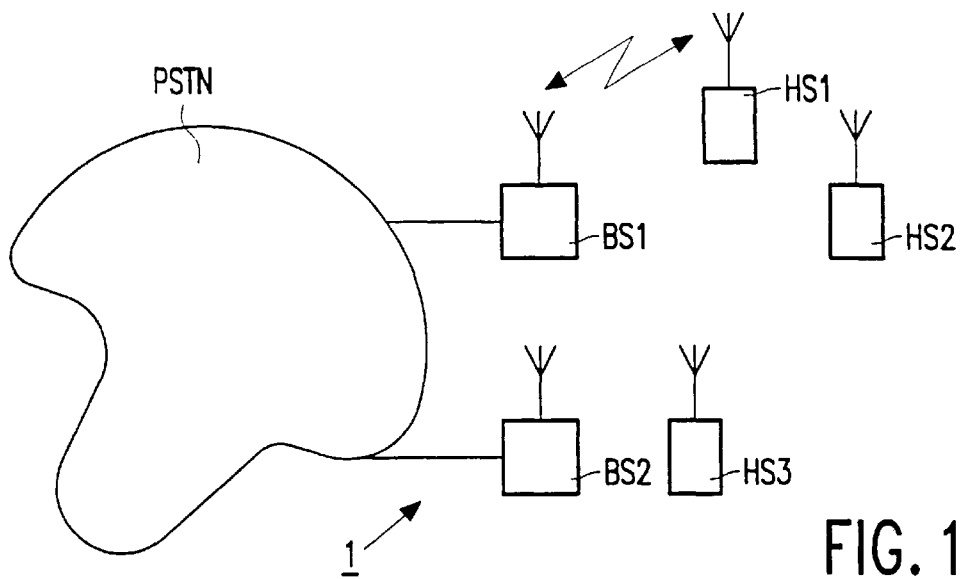

United States Patent [19]
Janssen

[11] Patent Number: 5,978,664
[45] Date of Patent: *Nov. 2, 1999

[54] WIRELESS DIGITAL COMMUNICATION DEVICE, AND A PEAK-DETECTOR

[75] Inventor: Daniel J. G. Janssen, Eindhoven, Netherlands

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/683,332

[22] Filed: Jul. 18, 1996

[30] Foreign Application Priority Data

Jul. 21, 1995 [EP] European Pat. Off. ............. 95202010

[51] Int. Cl.⁶ .............................. H04B 1/16; H03K 5/153
[52] U.S. Cl. ........................ 455/226.2; 455/334; 327/59
[58] Field of Search ......................... 455/67.1, 69, 214, 455/226.2, 226.4, 334, 337, 437, 313, 239.1; 327/50, 51, 58, 73, 66, 59, 60, 62, 91, 94; 375/239, 317, 313, 365

[56] References Cited

U.S. PATENT DOCUMENTS

| | | |
|---|---|---|
| 4,884,141 | 11/1989 | Hyakutake ............................ 455/239.1 |
| 4,910,521 | 3/1990 | Mellon .................................... 375/365 |
| 5,471,169 | 11/1995 | Dendinger ................................ 327/66 |
| 5,502,746 | 3/1996 | Ozguc .................................... 375/317 |
| 5,546,027 | 8/1996 | Shinozaki et al. ........................ 327/73 |
| 5,666,379 | 9/1997 | Ovard et al. ............................ 375/239 |

OTHER PUBLICATIONS

"Operational Amplifier—Design and Applications", by J.G. Graeme et al, McGraw–Hill, Kogakusha, Ltd., pp. 353–358.

*Primary Examiner*—Thanh Cong Le
*Assistant Examiner*—Lester G. Kincaid

[57] ABSTRACT

A peak detector that is particularly suitable for measuring the peak value of an RSSI-signal in a digital communication device. The peak detector includes a peak value storage capacitor which is charged by a high current or by a low current. When the RSSI-signal is greater than the output voltage of the peak detector, the storage capacitor is charged with the low current. When the RSSI-signal is substantially greater than the output voltage of the peak detector, the storage capacitor is charged with the high current. Herewith, it is achieved that the peak value of the RSSI-signal is determined quickly, without any overshoot, i.e. the peak value is determined accurately.

8 Claims, 3 Drawing Sheets

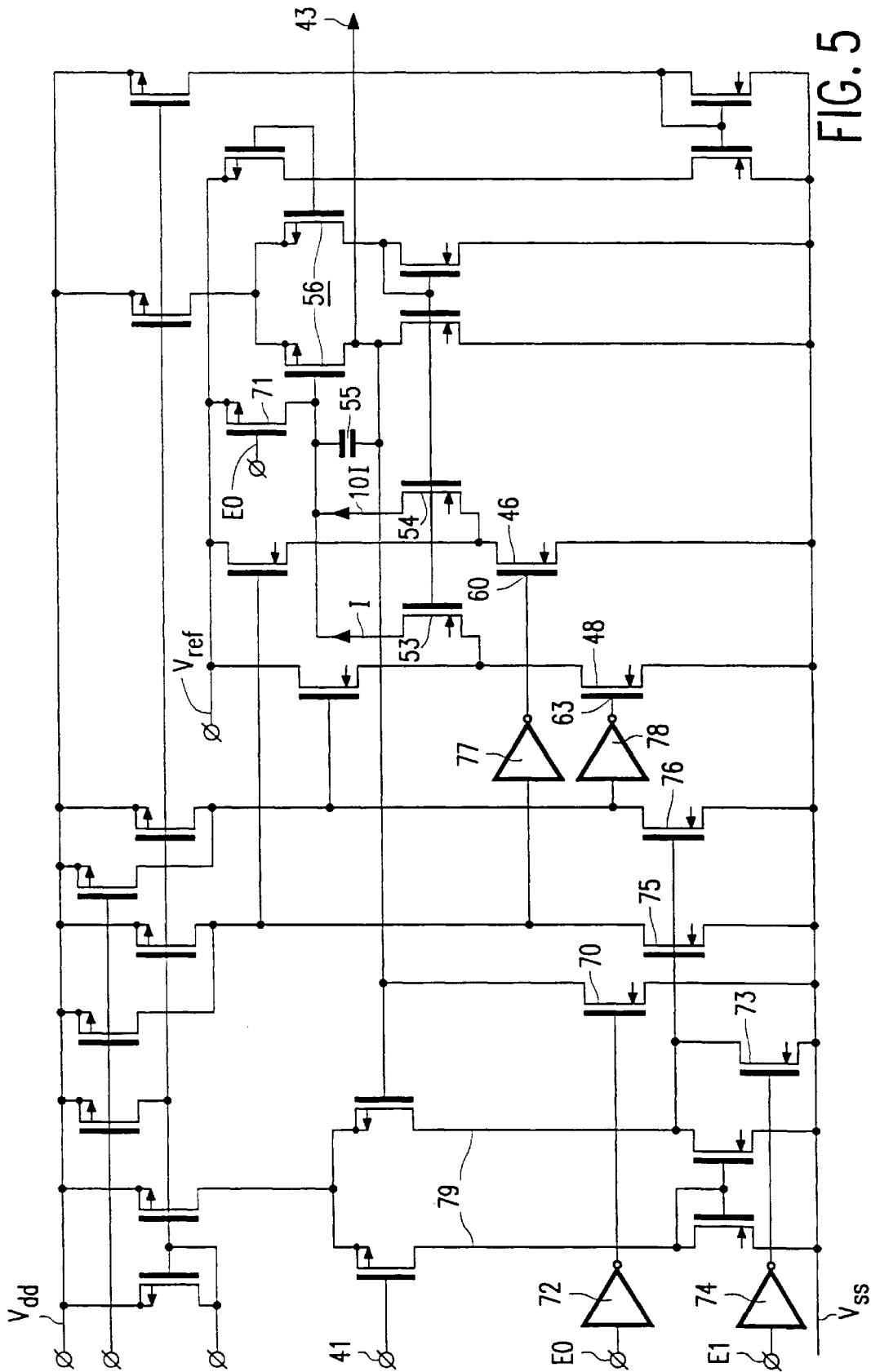

WIRELESS DIGITAL COMMUNICATION DEVICE, AND A PEAK-DETECTOR

The present invention relates to a wireless digital communication device comprising a receiver front-end, a mixer, a received-signal-strength-indicator arrangement for providing an RSSI-signal, and a peak-detector for detecting the RSSI-signal.

The present invention further relates to a peak-detector.

A peak-detector is known from the handbook "Operational Amplifiers", J. G. Graeme et al, McGraw-Hill Kogakusha 1971, pp. 353–358. In a wireless digital communication device such as a digital cordless telephone device, a peak-detector is applied for measuring the peak value of a so-called RSSI-signal (Received-Signal-Strength-Indicator). The known peak-detector is not very suitable for use as an RSSI-signal measurement device in such a wireless digital communication device because it is difficult to dimension such a peak-detector for measuring an RSSI-signal peak. Either there is a risk that the peak-detector exhibits overshoot, or the peak-detector cannot follow a fast rising slope of the RSSI-signal.

It is an object of the present invention to provide a wireless digital communication device with a peak-detector for accurately measuring an RSSI-signal peak. It is a further object of the present invention to provide a peak-detector for a wireless digital communication device requiring a relatively small chip area when implemented as an integrated circuit.

To this end the wireless digital communication device is characterized in that the peak-detector comprises a storage capacitor for storing a peak-value of the RSSI-signal during a peak signal measurement, and comparator and switching means for determining whether an input voltage is substantially smaller or is in the order of the same magnitude as the output voltage of the peak detector, the switching means switching a first current to the storage capacitor when it is determined that the input voltage is substantially smaller than the output voltage, and switching a second current which is substantially smaller than the first current to the storage capacitor when the input voltage is in the order of the same magnitude as the output voltage. The choice of the first and second current can be done empirically. The further object is achieved by multiplexing the output of the peak-detector and other voltage signals from which a magnitude has to be determined, and feeding an output of the multiplexer to a voltameter such as an analog-to-digital converter.

Figure 2:
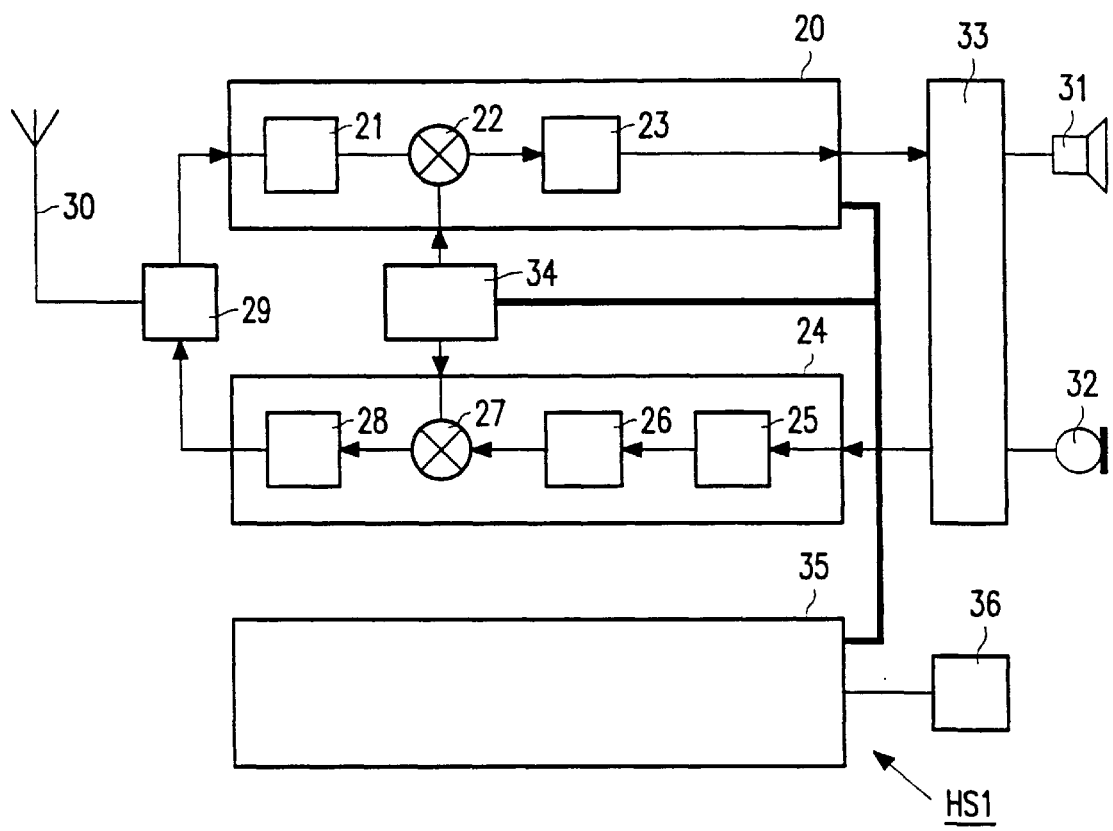
Figure 3:
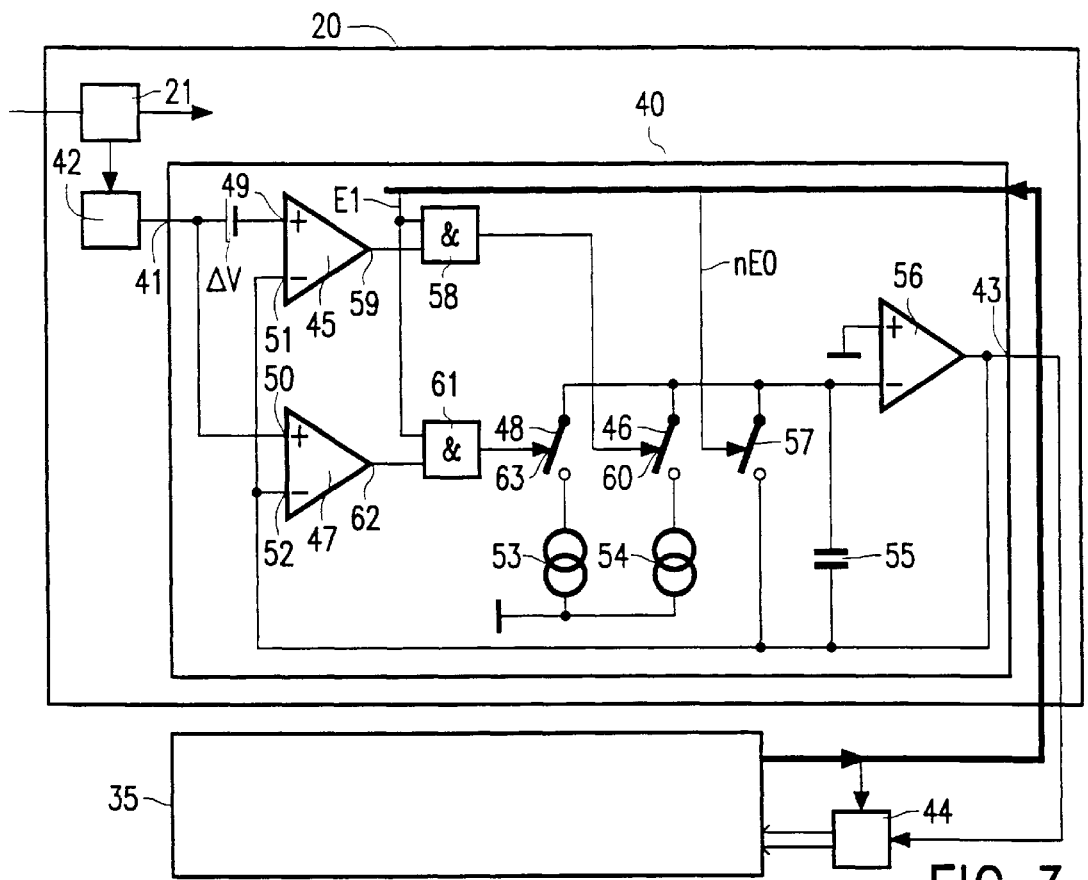
Figure 4:
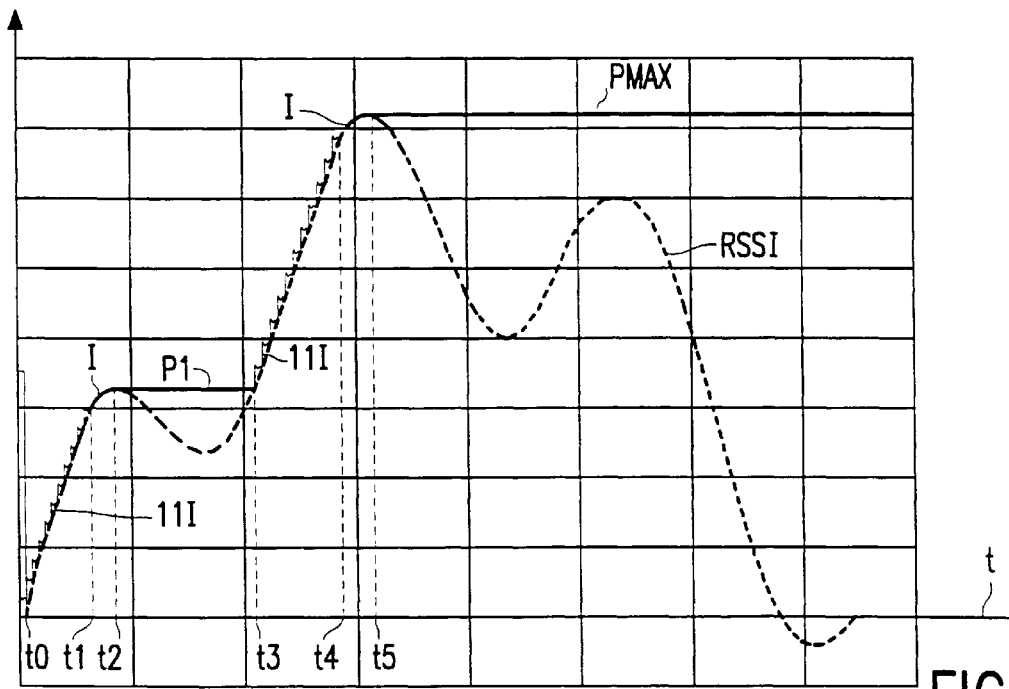

The present invention will now be described, by way of example, with reference to the accompanying drawings, wherein FIG. 1 schematically shows a wireless digital communication system, FIG. 2 shows a block diagram of the wireless digital communication device for use in a wireless digital communication system, FIG. 3 shows a block diagram of a peak detector according to the present invention, FIG. 4 shows a timing diagram for an RSSI-measurement using the peak detector according to the present invention, and FIG. 5 shows a detailed circuit diagram of a peak detector according to the present invention.

Throughout the figures the same reference numerals are used for the same features.

FIG. 1 schematically shows a wireless digital communication system 1, in the given example a digital cordless telephony system in accordance with the DECT Standard (Digital European Cordless Communications) as standardized by ETSI (European Telecommunications Standards Institute). The system 1 comprises radio base stations BS1 and BS2 coupled to the public switched telephone network PSTN. Further shown are cordless handsets HS1, HS2, and HS3 which are arranged for bi-directional communication with the base stations to which they are authorized to communicate. Although the cordless system is shown in its simplest form, more elaborate systems concepts are possible, such as combinations with PABXs (Private Automatic Branch Exchange) with cordless extensions, Telepoint stations, forming of microcells with roaming, or the like. The present invention may be included into a transceiver of such a system, but may also be included into any other suitable device or system.

FIG. 2 shows a block diagram of the wireless digital communication device HS1, e.g. a DECT cordless handset, which comprises a receiver 20 having a receiver front-end 21, a mixer 22, and a demodulator 23. The device HS1 further comprises a transmitter 24 having a pulse shaping filter 25, a modulator 26, a mixer 27, and a transmit power amplifier 28. At RF-side, the receiver 20 and the transmitter 24 are coupled to a receive/transmit switch 29 which is coupled to an antenna 30. At LF-side, the receiver 20 and the transmitter 24 are coupled to a telephone receiver or loudspeaker 31 and a microphone 32 via an audio processor 33. For tuning to a desired radio channel, the handset HS1 comprises a controllable frequency source 34. The handset HS1 is controlled by a microcontroller 35 which is coupled to the receiver 20, to the transmitter 24, to the controllable frequency source, and further to a keypad 36 for user control of the handset HS1. The microcontroller 35 comprises RAM, and ROM and other non-volatile memory (not shown) for executing stored programs, for storing predetermined data, and for storing temporary data. As far as the radio parts are concerned, the base station BS1 has a similar architecture.

FIG. 3 shows a block diagram of a peak detector 40 according to the present invention in the receiver 20 of the handset HS1, showing the principle of the peak-detector 40. An input 41 of the peak detector 40 is coupled to the receiver front-end 21 via an RSSI-detector 42. RSSI-detectors are well-known in the art. An output 43 of the peak detector 40 is coupled to the microcontroller 35 via an analog-to-digital converter 44. The microcontroller 35 controls and reads out the peak detector 40. At input side, the peak detector 40 comprises a comparator 45 for closing a switch 46 when the voltage at the input 41 is substantially higher than the voltage at the output 43, and a comparator 47 for closing a switch 48 when the voltage at the input 41 is higher than the voltage at the output 43, when the peak detector is in a signal follow mode. To this end the input 41 of the peak detector 40 is coupled to an input 49 of the comparator 45 via a voltage source ΔV and is connected to an input 50 of the comparator 47, and the output 43 of the peak detector 40 is connected to an input 51 of the comparator 45 and to an input 52 of the comparator 47. The switch 48 controls a relatively low current source 53, and the switch 46 controls a relatively high current source 54. The current ratio of the current sources 53 and 54 can be suitably chosen, e.g. the current source 54 can have a ten times higher magnitude than the current source 53. The peak detector 40 further comprises a storage capacitor 55 which is coupled to a parallel arrangements of the respective series arrangement of the switch 48 and the current source 53, and the series arrangement of the switch 46 and the current source 54. In the signal follow mode the capacitor 55 stores the peak value of the voltage at the input 41 of the peak detector 40. The capacitor 55 is further coupled to an output buffer amplifier 56 of the peak detector 40. The value ΔV can be suitably chosen, and determines at what voltage difference between input and output of the peak detector 40 the high current source 54 is switched to the capacitor 55. A switch 57 is coupled parallel to the capacitor 55 for discharging the same under control of the microcontroller 35. To this end, an enable signal nE0 controls the switch 57, n being an inversion of an enable signal E0. The peak detector 40 further comprises an and-gate 58 coupled at input side to an output 59 of the comparator 45 and coupled at output side to a control input 60 of the switch 46, and an and-gate 61 coupled at input side to an output 62 of the comparator 47 and coupled at output side to a control input 63 of the switch 48. The and-gates 58 and 61 are coupled with further inputs to an enable signal E1 provided by the microcontroller 35. The control of the peak detector 40 is as follows. For the enable signals E0=E1="0", the output 43 of the peak detector 40 is reset. For the enable signals E0=E1="1", the peak detector 40 is in the input signal follow mode, and for the enable signals E0="1" and E1="0", the peak detector 40 is in a hold mode so that the microcontroller can read out the voltage stored at the capacitor 55. The enable signal combination E0="0" and E1="1" is not allowed.

FIG. 4 shows a timing diagram for an RSSI-measurement using the peak detector 40 according to the present invention. An RSSI-signal RSSI at the input 41 is shown as a function of time t. At rising edges of the signal RSSI, quick charging of the storage capacitor 55 with a current 11I occurs when the signal RSSI is substantially below the signal peak, and slow charging of the storage capacitor 55 occurs with a current I when the signal RSSI is close to the peak signal. Shown is an RSSI-signal initially having a relative peak value P1, and finally having an absolute peak value PMAX, the latter being the peak of the RSSI-signal to be measured. At the start of the peak value measurement, at an instant t0, both current sources 53 and 54 are switched to the storage capacitor 55, at an instant t1, the high current source 54 is switched off, at an instant t2, both current sources 53 and 54 are switch off, at an instant t3, both current sources 53 and 54 are switched on again, and an instant t4, the current source 54 is switched off, and eventually, at an instant t5, also the current source 53 is switched off.

FIG. 5 shows a detailed circuit diagram of the peak detector 40 according to the present invention, in MOS-technology. Supply voltages $V_{dd}$ and $V_{ss}$ are shown, and a reference voltage $V_{ref}<V_{dd}$. When the enable signal E0="0", the output voltage at the output 43 is reset by a MOS-switch 70, the capacitor 55 being loaded to $V_{ref}$ via a switch 71, the enable signal E0 being fed to the switch 70 via an inverter 72. When the enable signal E0="1" and the enable signal E1="0", the switch 70 is open, and a switch 73 is closed, the enable signal E1 being fed to the switch 73 via an inverter 74. When the switch 73 is closed, switches 75 and 76 are open so that also the switches 46 and 48 for controlling the current sources 54 and 53 are open. The switches 75 and 76 are connected to the control inputs 60 and 63 of the switches 46 and 48 via respective inverters 77 and 78. Accordingly, in this state no load current flows through the capacitor 55, and the voltage at the output 43 remains stable. When the enable signal E0=E1="1", the peak detector is in input signal follow mode. Then, a comparator 79 compares the voltages at the input 41 and the output 43. When in this state the input voltage is higher than the output voltage, the low current source 53 is switched to the capacitor. When the input voltage is substantially higher than the output voltage, also the high current voltage source is switched to the capacitor. When in this mode the input voltage is lower than the output voltage, both charging currents are switched of via the switches 75 and 76. The magnitude-ratio of the low and high current sources is chosen by choosing respective source areas of the MOS-switches 53 and 54 accordingly. The switching behaviour of the low and high current sources, i.e. the point in time during peak detection where the high current source 54 is switched off is determined by choosing different source areas of the MOS-switches 75 and 76 accordingly. The further MOStransistors shown are for adjusting appropriate currents or the like, and are not described in detail here.

I claim:

1. A wireless digital communication device comprising a receiver front-end, a mixer, a received-signal-strength-indicator for providing an RSSI-signal, and a peak-detector for detecting the RSSI-signal, which peak-detector comprises:

a single storage capacitor for storing a peak-value of the RSSI-signal during a peak signal measurement; and a comparator means and a switching means for determining whether an input voltage is substantially larger as an output voltage of the peak-detector, is in the order of the same magnitude but still larger as the output voltage, or is smaller as the output voltage, the switching means switching a first current and a second current to the single storage capacitor when it is determined that the input voltage is substantially larger than the output voltage, the second current being substantially smaller than the first current, disconnecting the first current from the single storage capacitor when the input voltage is in the order of the same magnitude but still larger as the output voltage, and disconnecting both the first and second currents from the single storage capacitor when it is determined that the input voltage is smaller as the output voltage.

2. A wireless digital communication device according to claim 1, further comprising an analog-to-digital converter coupled to the peak-detector for reading out peak values.

3. A peak-detector for detecting a signal, which peak-detector comprises:

a single storage capacitor for storing a peak-value of the signal during a peak signal measurement; and a comparator means and a switching means for determining whether an input voltage is substantially larger as an output voltage of the peak-detector, is in the order of the same magnitude but still larger as the output voltage, or is smaller as the output voltage, the switching means switching a first current and a second current to the single storage capacitor when it is determined that the input voltage is substantially larger than the output voltage, the second current being substantially smaller than the first current, disconnecting the first current from the single storage capacitor when the input voltage is in the order of the same magnitude but still larger as the output voltage, and disconnecting both the first and the second currents from the single storage capacitor when it is determined that the input voltage is smaller as the output voltage.

4. A peak-detector for detecting a peak-value of a signal, said peak-detector comprising:

a single storage capacitor for storing said peak-value of said signal during a peak signal measurement, said measured peak-value being an output voltage of said peak-detector, and said signal being an input voltage of said peak-detector;

a first current source providing a first current;

a second current source providing a second current, said second current being substantially smaller than said first current;

a determining means for determining whether said input voltage is substantially larger than said output voltage, is in the order of the same magnitude but still larger than said output voltage, or is smaller than said output voltage; and a switching means for coupling said first and second current sources to said single storage capacitor when it is determined that said input voltage is substantially larger than said output voltage, for decoupling said first current source from said single storage capacitor when it is determined that said input voltage is in the order of the same magnitude but still larger than said output voltage, and for decoupling both said first and second current sources from said single storage capacitor when it is determined that said input voltage is smaller than said output voltage, said switching means being coupled to said determining means.

5. A peak-detector as claimed in claim 4, wherein said signal is a received-signal-strength-indication signal obtained by a received-signal-strength-indicator in a wireless digital communication device.

6. A peak-detector as claimed in claim 4, wherein said second current is in the order of magnitude of one tenth of said first current.

7. A peak-detector as claimed in claim 4, wherein said first current source comprises a said first current determining first transistor and a said second current determining second transistor, a ratio of said first and second currents being determined by relative chip areas of said first and second transistors.

8. A peak-detector as claimed in claim 7, comprising a third transistor and a fourth transistor, said third and fourth transistors being coupled to said determining means and controlling said first and second transistors, respectively, an output terminal of said third transistor being coupled to said first transistor, an output terminal of said fourth transistor being coupled to said second transistor, and a control input of said third transistor being coupled to a control input of said fourth transistor, whereby a switching-over behavior of said first and second current sources from being switched to said single storage capacitor to being decoupled from said single storage capacitor is determined by relative chip areas of said third and fourth transistors.

* * * * *